Dec. 29, 1942.  W. T. CALDWELL  2,306,800
PISTON
Filed May 6, 1940
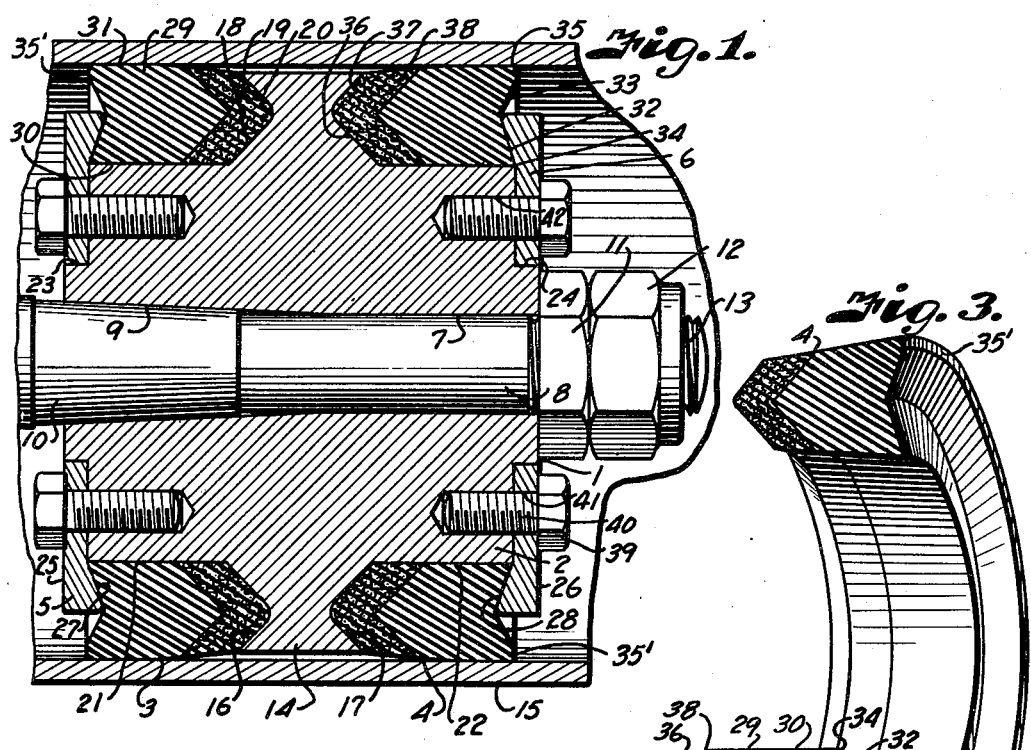
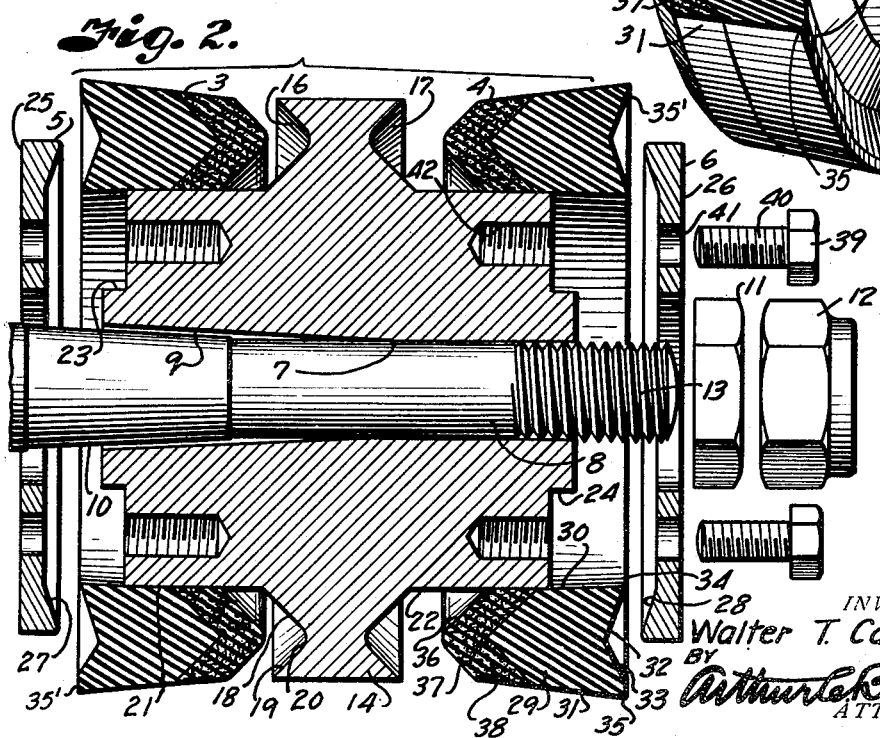
INVENTOR
Walter T. Caldwell.
BY Arthur E. Browne
ATTORNEY Patented Dec. 29, 1942

2,306,800

UNITED STATES PATENT OFFICE 2,306,800

PISTON

Walter T. Caldwell, Enid, Okla., assignor to The George E. Failing Supply Company, Enid, Okla., a corporation of Oklahoma Application May 6, 1940, Serial No. 333,569

2 Claims. (Cl. 309—23)

This invention relates to pistons, particularly for use in slush and like pumps where sealing elements of the piston are subjected to high pressure and abrasive action.

Packing elements in pistons of this character are usually formed of resilient material in order to maintain the required seal, but distortion under high working pressures causes the packings to rapidly deteriorate and permit leakage not only between the piston and cylinder wall of the pump but through the piston structure itself.

It is, therefore, a principal object of the present invention to provide a packing ring and piston structure wherein resiliency of the packing rings is controlled and a positive seal is effected at points to be sealed with respect to the cylinder wall and body of the piston.

Other objects of the invention are to provide a packing ring formed of sufficiently resilient material to maintain the required seals; to back and reinforce the resilient material with plies of fabric thoroughly impregnated with and vulcanized into the body of the resilient material; and to provide for better adhesion and more secure bond of the resilient material and the plies of fabric.

It is a further object to provide for wedge seating of the packing rings on the piston body.

In accomplishing these and other objects of the invention, as hereinafter pointed out, I have provided improved details of structure, the preferred form of which is illustrated in the accompanying drawing, wherein:

Fig. 1 is a sectional view through a pump cylinder containing a piston embodying the features of the present invention, the piston being shown in section to better illustrate seating of the packing rings and the sealing points thereof with respect to the body of the piston and cylinder.

Fig. 2 is a section through the piston, the parts of which are shown in spaced relation to better illustrate the construction as well as the normal cross-sectional shape of the packing rings.

Fig. 3 is a detail perspective view of one of the packing rings partly in section.

Referring more in detail to the drawing:

1 designates a piston constructed in accordance with the present invention and which includes a substantially cylindrical body 2 carrying oppositely disposed packing rings 3—4 which are secured in position by clamping rings 5 and 6.

In the illustrated instance the body 2 comprises a barrel having an axial bore 7 to mount the piston on a rod 8. The bore 7 has a tapered counterbore 9 at one end to wedgingly engage a correspondingly tapered portion 10 of the piston rod, whereby the piston is rigidly wedged on the rod incidental to application of lock nuts 11 and 12 mounted upon a projecting threaded end 13 of the rod. The tapered portions 9 and 10 not only provide rigid seating of the piston with respect to the rod but they provide a positive seal to prevent leakage by way of the bore 7.

The cylindrical or barrel portion of the piston body has a lateral flange 14 located intermediate the ends thereof and which is of slightly smaller outer diameter than the inner diameter of the pump cylinder 15 in which the piston is installed. The respective sides of the flange 14 are provided with substantially V-shaped annular grooves 16 and 17 having inner and outer converging side faces 18 and 19, the inner faces tapering outwardly from the cylindrical body of the piston and the outer faces tapering inwardly from the cylindrical periphery of the flange 14 to join in a rounding bottom portion 20 as clearly shown in Fig. 2. The outer faces thus form circumferential packing ring constrictions and the inner faces form packing ring sealing seats. The cylindrical faces 21 and 22 at the respective sides of the flange 14 centeringly mount the piston rings 3 and 4 on the piston body. The end faces of the piston are preferably provided with external shoulder grooves 23 and 24 to seat the clamping rings 5 and 6, so that the outer faces 25 and 26 lie flush with the terminal ends of the piston body as clearly shown in Fig. 1. The clamping rings are of sufficient diameter to project substantially midway between the cylindrical faces 21 and 22 of the piston body and the inner face of the cylinder 15, and the inner faces of the projecting portions are formed on inwardly extending bevels 27 and 28 at a slightly greater angle than the faces 18 have with respect to the axis of the piston.

The packing rings 3 and 4 are of identical construction and are best illustrated in Fig. 3. Each packing ring includes a body of resilient material as indicated at 29, having inner and outer faces 30 and 31, the inner face 30 substantially conforming in diameter to the outer diameter of the face 21 or 22.

The inner face 31 substantially corresponds to the diameter of the flange 14, but the diameter thereof at the opposite side is larger than the corresponding diameter of the cylinder, whereby the outer portion of each ring is caused to sealingly engage the wall when the rings are assembled in the piston structure. The outer end faces of the rings are provided with annular grooves of V-shaped formation to form converging faces 32 and 33 which cooperate with the faces 30 and 31 to form inner and outer annular sealing lips 34 and 35. The outer lips 35 are flattened, as at 35', on the faces thereof to avoid a sharp edge and to promote wearing qualities of the lips. The opposite end faces of the rings diverge outwardly in substantially V-shaped formation to provide faces 36 and 37 corresponding to the faces 18 and 19 of the flange grooves so that when the packing rings are applied the inner faces thereof are wedged within the grooves of the flange to further enhance seal of the rings with the piston body. Wedging contact of the faces 18 with the faces 36 of the packing rings tends to effect outward expansion of the rings, however, this tendency to distort is resisted by the opposed wedging action of the faces 16 and 37 to maintain the diameter of the rings at this point. Attention is here directed to the fact that the diameters of the retaining rings 5 and 6 correspond to the diameter of the juncture of the sealing lips 34 and 35.

To further control and limit deformation of the rings under pressure, the inner portions thereof have incorporated therein a plurality of plies of fabric 38 which are impregnated and thoroughly vulcanized in the resilient material, as clearly shown in the drawing, so that they, in effect, become integral parts of the rings. The reinforcing plies firmly back the reinforced portions of the rings so as to prevent extrusion and movement of the resilient material into the space between the outer face of the flange 14 and the wall of the cylinder that usually causes rapid deterioration of the resilient packings under pressure.

In assembling the piston, the packing rings 3 and 4 are sleeved over the ends of the barrel portion so that the V-shaped inner faces thereof engage in the V-shaped grooves of the flange 14. The clamping rings 5 and 6 are then applied and secured by cap screws 39, having threaded shanks 40 extending through openings 41 in the clamping rings and into threaded sockets 42 in the respective ends of the piston. When the cap screws are tightened in place the bevelled faces 27 and 28 of the clamping rings engaging the faces 32 of the packing rings further enhance pressing action of the lips 34 against the piston body to positively prevent leakage therebetween. When the piston is applied to the rod and inserted in the cylinder, the lip portions 35 are compressed to maintain initial sealing engagement with the cylinder, which sealing engagement is supplemented by pressure of fluid acting upon the respective faces 33. It is thus obvious that when the packing rings are applied, seals are effected with the piston body at three points so that they are firmly anchored to control any distortion caused by pressure acting on the ends of the piston and to limit distortion to the vicinity of the sealing lips 34 which are in contact with the wall of the cylinder. It is also obvious that the retaining rings being of a diameter corresponding to the diameter of the juncture of the inner and outer lips of the packing rings, the outer lips are entirely free and unsupported by the retainer rings when the piston is reciprocated in the cylinder.

From the foregoing it is obvious that I have provided a piston structure which is well adapted for use in connection with slush pumps and similar pressure appliances, and which is adapted for long service under high pressure and abrasive materials.

What I claim and desire to secure by Letters Patent is:

1. A piston for slush pumps including, a cylindrical body, a circumferential flange on said body intermediate the ends thereof and having a cylindrical periphery of slightly smaller diameter than the diameter of the cylinder in which the piston is installed and having respective sides thereof provided with a substantially V-shaped annular groove with the inner face of said grooves tapering outwardly from the cylindrical body and the outer face of said grooves tapering inwardly from the cylindrical periphery of the flange so that the outer faces form circumferential packing ring constrictions and the inner faces form packing ring sealing seats, packing rings of solid construction sleeved over ends of the cylindrical body, each having one end provided with tapering faces substantially conforming to the taper of said faces of the flange grooves, said opposite ends of the rings having substantially V-shaped annular grooves forming inner and outer annular lips tapering in the direction of the inner and outer faces of the flange grooves, and retainer rings fixed to the cylindrical body of the piston and of a diameter corresponding to the diameter of juncture of said inner and outer lips whereby said outer lips are entirely free and unsupported by said retainer rings when the piston is reciprocated in the cylinder, said retainer rings having clamping faces to engage only the inner lips of the packing rings and cooperate with the faces of the flange grooves in retaining the packing rings in sealing contact with the cylindrical body of the piston and in engagement with the circumferential constricting faces of said flange grooves to prevent leakage through the piston structure and control circumferential distortion of said packing rings.

2. A piston for slush pumps including, a cylindrical body, a circumferential flange on said body intermediate the ends thereof and having a cylindrical periphery of slightly smaller diameter than the diameter of the cylinder in which the piston is installed and having respective sides thereof provided with a substantially V-shaped annular groove with the inner face of said grooves tapering outwardly from the cylindrical body and the outer face of said grooves tapering inwardly from the cylindrical periphery of the flange so that the outer faces form circumferential packing ring constrictions and the inner faces form packing ring sealing seats, packing rings of solid construction sleeved over ends of the cylindrical body, each having one end provided with tapering faces substantially conforming to the taper of said faces of the flange grooves and having inner and outer peripheral faces tapering from said flange grooves in the direction of said lips to promote sealing contact of said lips with the cylindrical body and cylinder respectively, said opposite ends of the rings having substantially V-shaped annular grooves forming inner and outer annular lips tapering in the direction of the inner and outer faces of the flange grooves, and retainer rings fixed to the cylindrical body of the piston and of a diameter corresponding to the diameter of juncture of said inner and outer lips whereby said outer lips are entirely free and unsupported by said retainer rings when the piston is reciprocated in the cylinder, said retainer rings having clamping faces to engage only the inner lips of the packing rings and cooperate with the faces of the flange grooves in retaining the packing rings in sealing contact with the cylindrical body of the piston and in engagement with the circumferential constricting faces of said flange grooves to prevent leakage through the piston structure and control circumferential distortion of said packing rings.

WALTER T. CALDWELL.